United States Patent
Wang et al.

(10) Patent No.: US 9,747,762 B1
(45) Date of Patent: Aug. 29, 2017

(54) ELECTRONIC DEVICE WITH SOUND GENERATOR

(71) Applicants: Hongxing Wang, Shenzhen (CN); Rongguan Zhou, Shenzhen (CN); Kun Tang, Shenzhen (CN)

(72) Inventors: Hongxing Wang, Shenzhen (CN); Rongguan Zhou, Shenzhen (CN); Kun Tang, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 0 days.

(21) Appl. No.: 15/354,472

(22) Filed: Nov. 17, 2016

(30) Foreign Application Priority Data

May 19, 2016 (CN) .................. 2016 2 0457997 U

(51) Int. Cl.
*G08B 6/00* (2006.01)
*H04M 1/02* (2006.01)

(52) U.S. Cl.
CPC ............ *G08B 6/00* (2013.01); *H04M 1/0266* (2013.01)

(58) Field of Classification Search
CPC .............................. G08B 6/00; H04M 1/0266
USPC ................................ 455/566, 569.1
See application file for complete search history.

(56) References Cited

U.S. PATENT DOCUMENTS

| 6,137,890 A * | 10/2000 | Markow | H04R 3/00 381/190 |
|---|---|---|---|
| 7,183,694 B2 * | 2/2007 | Nanataki | H01L 41/098 310/324 |
| 7,221,075 B2 * | 5/2007 | Nanataki | H01L 41/098 310/324 |
| 9,154,882 B2 * | 10/2015 | Berkhoff | H04R 7/045 |
| 2002/0132898 A1 * | 9/2002 | Takaya | H01B 3/442 524/445 |
| 2002/0176592 A1 * | 11/2002 | Howarth | H04R 17/00 381/190 |
| 2005/0130446 A1 * | 6/2005 | Takaya | H01B 3/442 438/780 |
| 2005/0130447 A1 * | 6/2005 | Takaya | H01B 3/442 438/780 |
| 2005/0154110 A1 * | 7/2005 | Takaya | H01B 3/442 524/413 |
| 2006/0108896 A1 * | 5/2006 | Nanataki | H01L 41/098 310/324 |
| 2006/0108897 A1 * | 5/2006 | Nanataki | H01L 41/098 310/324 |
| 2010/0076579 A1 * | 3/2010 | Naeh | G06F 1/181 700/94 |
| 2010/0111351 A1 * | 5/2010 | Berkhoff | H04R 7/045 381/396 |
| 2010/0324355 A1 * | 12/2010 | Spitaels | H04R 25/606 600/25 |
| 2010/0327703 A1 * | 12/2010 | Uetani | C04B 35/491 310/364 |

(Continued)

*Primary Examiner* — Hai V Nguyen

(74) *Attorney, Agent, or Firm* — Na Xu; IPro, PLLC

(57) ABSTRACT

An electronic device with sound generator is disclosed. The electronic device includes: a display screen; a middle frame assembled with the display screen; a supporting arm opposed to the middle frame; a piezoelectric actuator fixed on the supporting arm; and a bulge disposed between the middle frame and the supporting arm. The bulge is fixed to the middle frame, and connected to one end of the supporting arm.

10 Claims, 4 Drawing Sheets

(56) References Cited

U.S. PATENT DOCUMENTS

2014/0098978 A1\* 4/2014 Fukuoka .................. H04R 1/26
　　　　　　　　　　　　　　　　　　　　381/190
2014/0218317 A1\* 8/2014 berg ...................... G06F 3/0488
　　　　　　　　　　　　　　　　　　　　345/173
2016/0337760 A1\* 11/2016 Suenaga ............. H01L 41/0471

\* cited by examiner

ELECTRONIC DEVICE WITH SOUND GENERATOR

FIELD OF THE INVENTION

The present invention relates to an electronic device having a sound generator.

DESCRIPTION OF RELATED ART

With the upcoming mobile internet era, the amount of the smart mobile devices is increasing continuously. However, among various mobile device, mobile phone is the most common and portable mobile terminal equipment undoubtedly. So far, mobile phone users have higher and higher requirements to multifunctional mobile phones, however, the more functions the mobile phone has, the more components they need to embed, which causes that its internal space can't satisfy the demand of the component seriously. As a component that takes more space in the mobile phone, a piezoelectric actuator impacts the setup of its surrounding parts, e.g. preset camera, proximity sensor and earphone interface etc.

In the relevant technologies, the piezoelectric actuator needs up-to-down vibration to drive the mating components, and the piezoelectric actuator is directly attached onto the back of the equipment glass, without any interval set with the middle frame, which not only impacts the driving force of the piezoelectric actuator seriously, but also impacts the vocal performance of the equipment, as well as the space where its surrounding equipment are installed.

Therefore, it is necessary to provide an improved device to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

Embodiment 1

Figure 1:
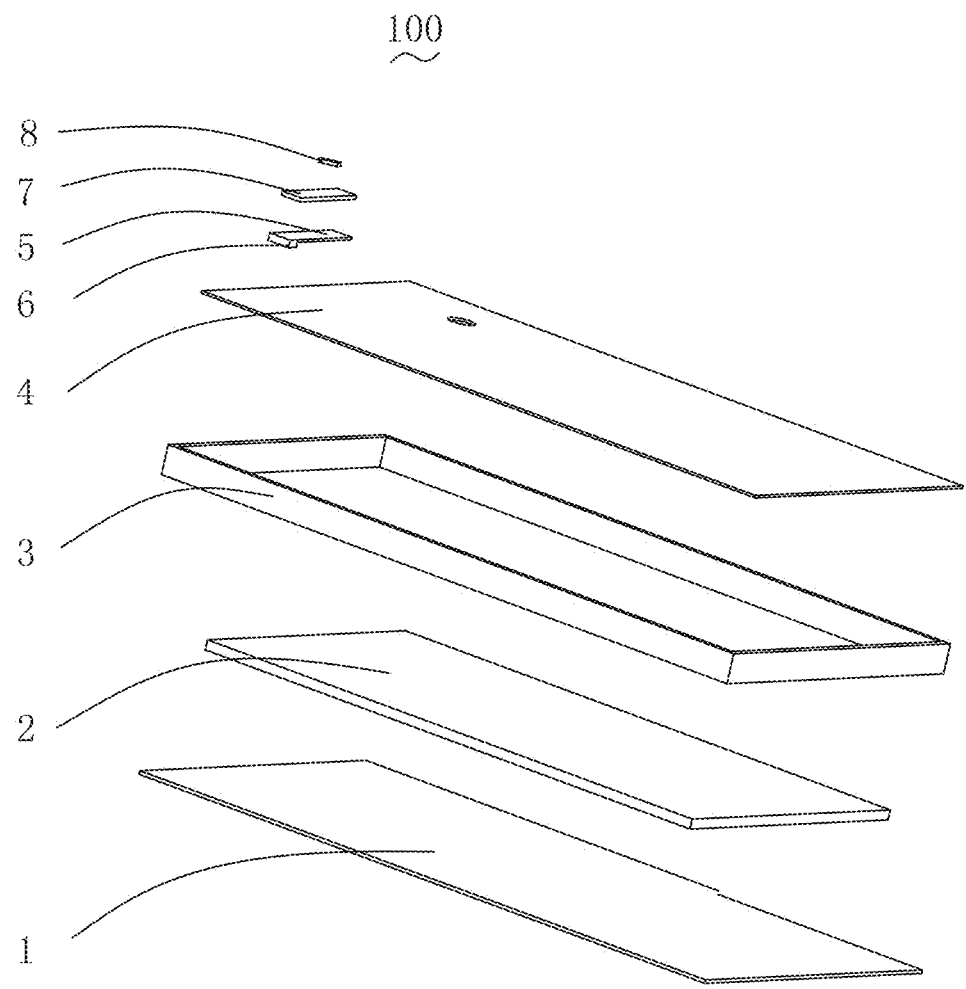
FIG. 1 is an isometric and exploded view of an electronic device with sound generator in accordance with a first exemplary embodiment of the present disclosure.
Figure 2:
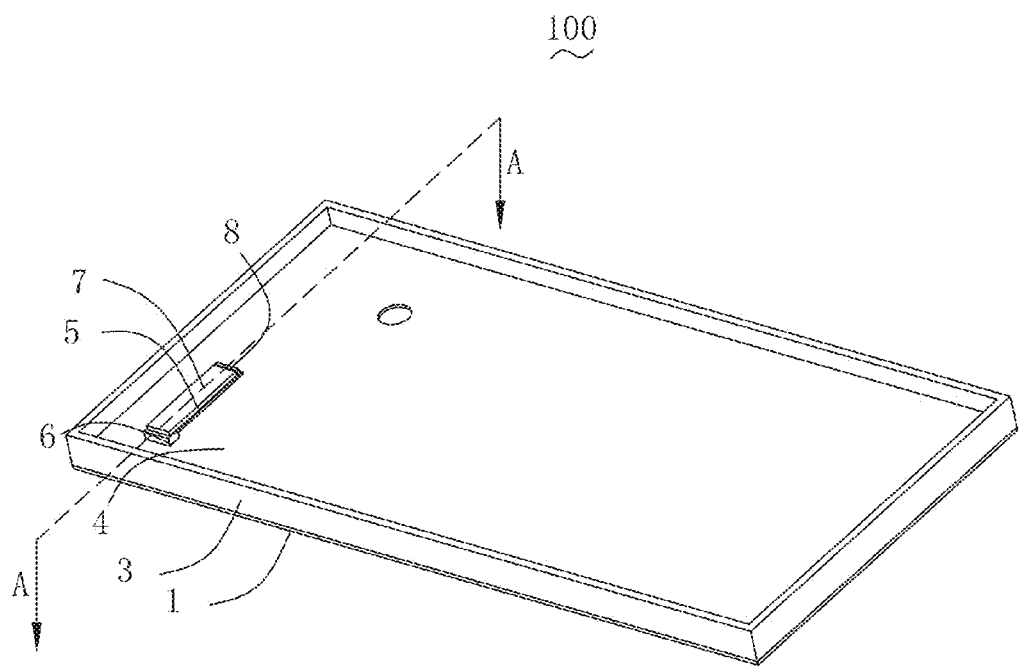
FIG. 2 is an exploded view of the electronic device with sound generator in FIG. 1.

Referring to FIGS. 1-2, an electronic device 100, in accordance with a first exemplary embodiment of the present disclosure, includes a glass panel 1, a display screen 2, a side frame 3, a middle frame 4, a supporting arm 5, a bulge 6, a piezoelectric actuator 7 and a weight 8.

The glass panel 1 is assembled with the side frame 3, and the display screen 2 and the middle frame 4 are assembled in the side frame 3. The display screen 2 is assembled in the glass panel 1. The bulge 6, the supporting arm 5 and the piezoelectric actuator 7 are assembled in the middle frame 4 in turn.

The middle frame 4 is a flat plate that covers the display screen 2, and the middle frame 4 is embedded in the side frame 3.

There are various shapes of the supporting arm 5, as long as they can support the piezoelectric actuator 7 and make the piezoelectric actuator 7 vibrate upwards and downwards. In this embodiment, the supporting arm 5 is a long strip opposed to the middle frame 4.

Figure 3:
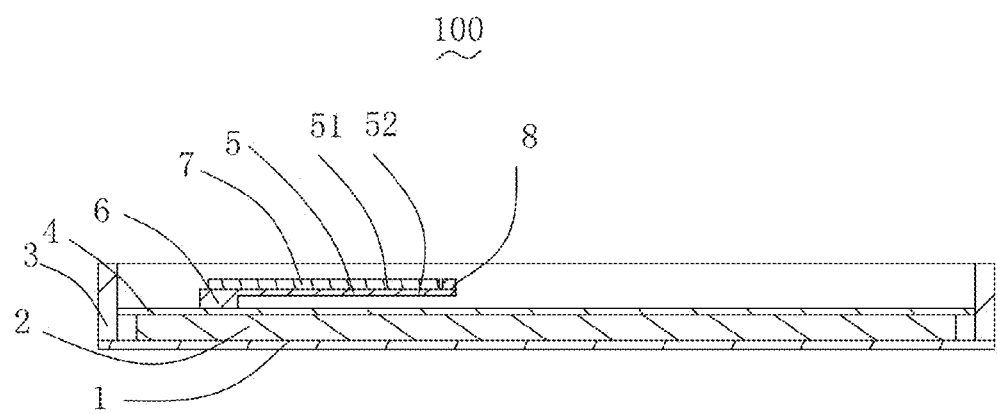
FIG. 3 is a cross-sectional view of the electronic device with sound generator taken along Line A-A in FIG. 2.

Referring to FIG. 3, the supporting arm 5 includes a lower surface 52 facing the middle frame 4 and an upper surface 51 opposite to the lower surface 52. And, the piezoelectric actuator 7 is fixed on the upper surface 51.

The supporting arm 5 and the bulge 6 are integrally formed. The supporting arm 5 and the bulge 6 form a cantilever beam structure, specifically, the bulge 6 at one end of the cantilever beam structure is connected and fixed to the middle frame 4, and the other end is suspended.

The shape of the bulge 6 is cylindrical or rectangular etc, and its frontal projected area towards the middle frame 4 is less than the frontal projected area of the piezoelectric actuator 7 towards the middle frame 4, in order to guarantee the utilization rate of its internal space.

The cantilever beam structure makes the piezoelectric actuator 7 keep a distance from the middle frame 4 in order to provide the piezoelectric actuator 7 with up-to-down motion space, and to output more driving force. The piezoelectric actuator 7 is suspended over the middle frame 4 by using cantilever beam structure, without attaching to the middle frame 4 directly, and the design of the cantilever beam structure not only improves the performance of the electronic device 100, but also saves its space of installing internal components.

The piezoelectric actuator 7 is tabular, with inverse photoelectric effect, i.e. it will suffer mechanical deformation under the acting force of externally electric field. The piezoelectric actuator is made of piezoelectric material that includes the piezoelectric crystal, piezoelectric ceramics and organic macromolecule piezoelectric material. The shape of the piezoelectric actuator 7 matches the shape of the supporting arm 5, on the one hand, it is convenient for installing and fixing the piezoelectric actuator 7, on the other hand, it can also improve the effective utilization rate of the component assembly space, and the piezoelectric actuator 7 can be made into round, rectangular or track etc, and the piezoelectric actuator 7 in this embodiment is a long strip.

The weight 8 is a rectangular and tabular structure, which is attached onto one end of the supporting arm 5 away from the bulge 6, i.e. the suspended end of the cantilever beam structure; and the weight 8 is fixed on the upper surface 51 of the supporting arm. This setup realizes the stable fixture of the weight 8, and guarantees the vibration stability of the piezoelectric actuator 7, in order to adjust the resonance frequency of the cantilever beam structure, and then adjust the final vocal performance.

There is certain distance between the weight 8 and the piezoelectric actuator 7, and the size of the distance is adjusted according to the size of the bulge 6, the supporting arm 5 and the piezoelectric actuator 7 and the weight of the piezoelectric actuator 7, in order to make that there is no impact interference between the piezoelectric actuator 7 and the weight 8 while the piezoelectric actuator 7 is vibrating in zigzag, and guarantee the vibration effect of the d piezoelectric actuator 7.

Embodiment 2

Figure 4:
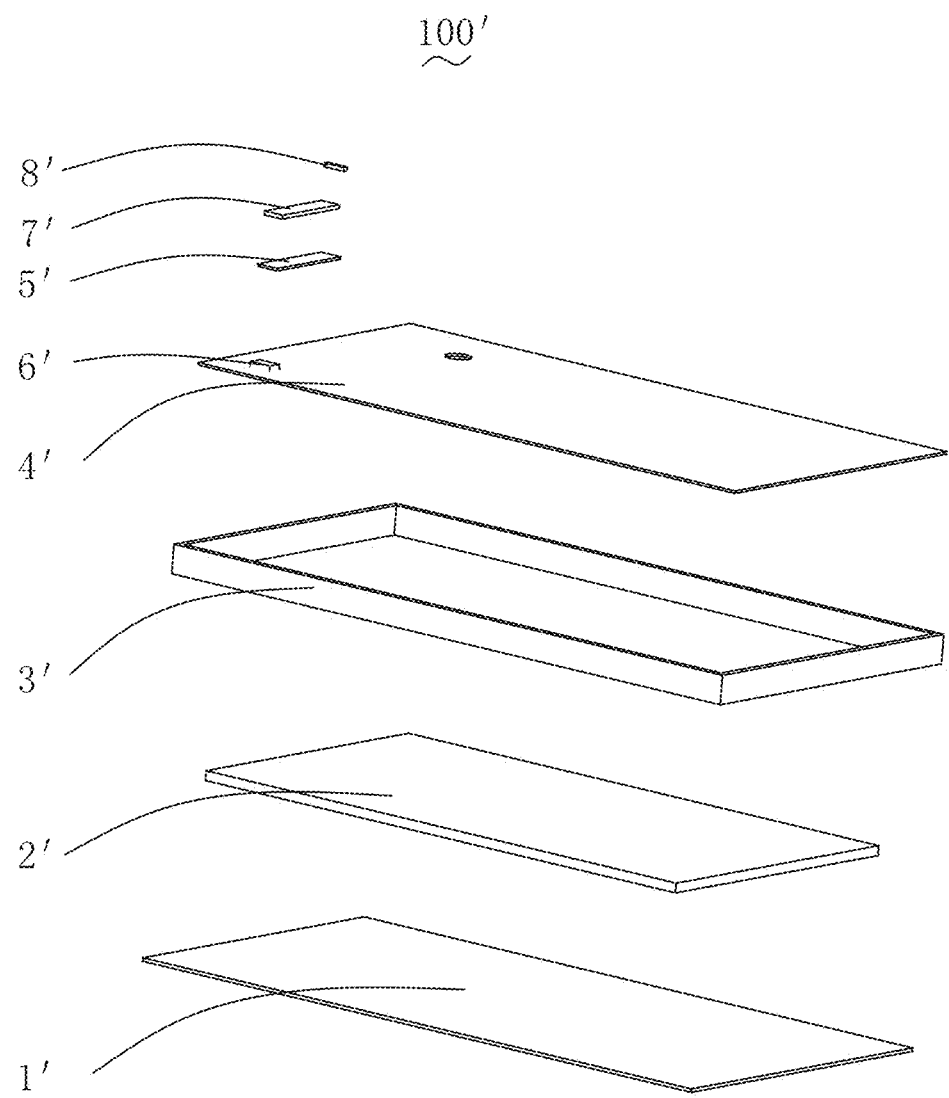
FIG. 4 is an exploded view of an electronic device with sound generator in accordance with a second exemplary embodiment of the present disclosure.
Figure 5:
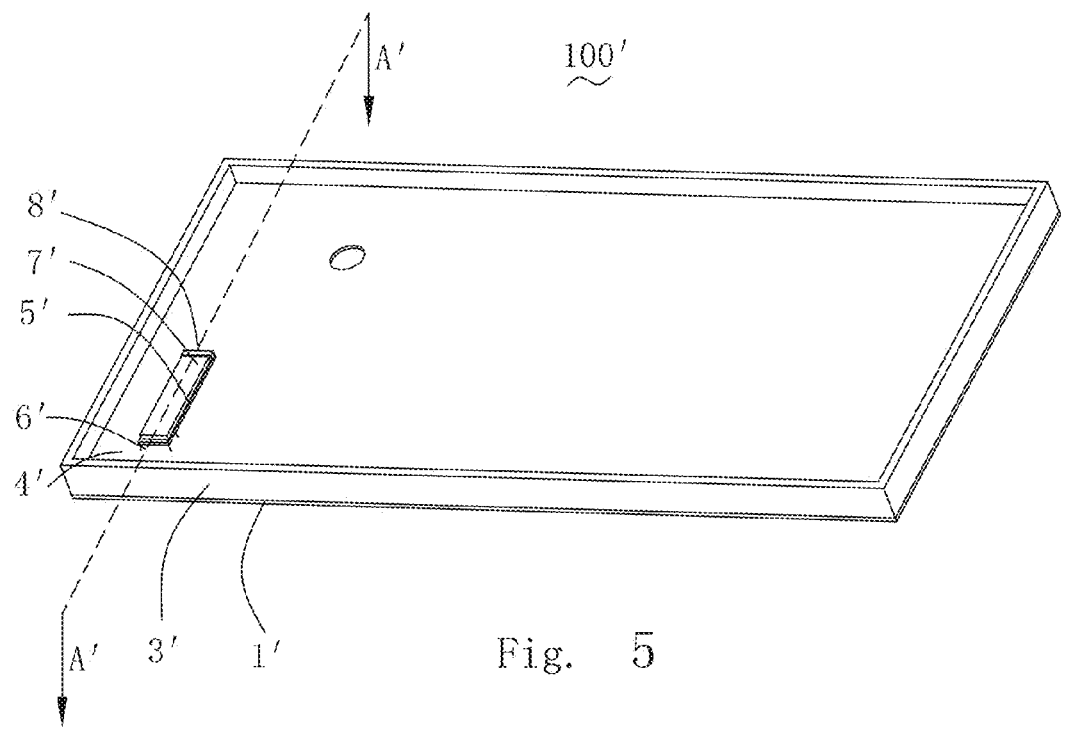
FIG. 5 is an isometric view of the electronic device with sound generator in FIG. 4.

Referring to FIGS. 4-5, an electronic device 100, in accordance with a second exemplary embodiment of the present disclosure, includes a glass panel 1', a display screen 2', a side frame 3', a middle frame 4', a supporting arm 5', a bulge 6', a piezoelectric actuator 7' and a weight 8'.

The glass panel 1' is assembled with the side frame 3', and the display screen 2' and the middle frame 4' are assembled in the side frame 3'. The display screen 2' is assembled in the glass panel 1'. The bulge 6', the supporting arm 5' and the piezoelectric actuator 7' are assembled in the middle frame 4' in turn.

One end of the supporting arm 5' is assembled over the bulge 6', and the other end is suspended.

Figure 6:
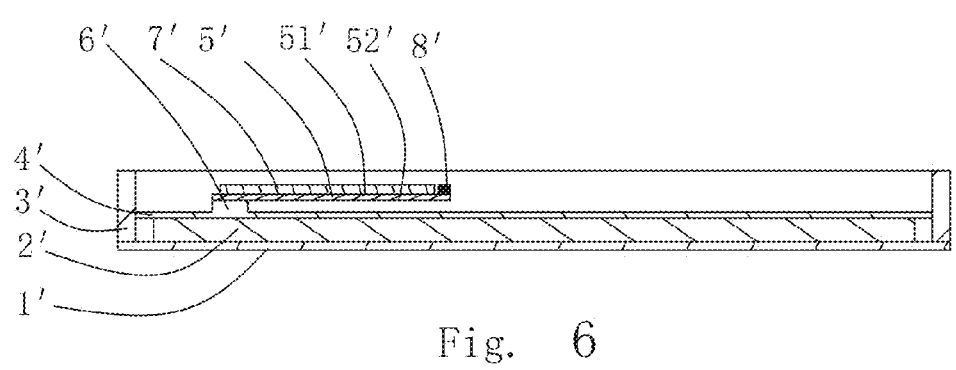
FIG. 6 is a cross-sectional view of the electronic device with sound generator taken along Line A'-A' in FIG. 5.

Referring to FIG. 6, the supporting arm 5' is a long strip, and includes a lower surface 52' facing the middle frame 4' and an upper surface 51' opposite to the lower surface 52'. The piezoelectric actuator 7' is fixed on the upper surface 51'.

The bulge 6' is rectangular, and the bulge 6' and the middle frame 4' are integrally formed. A frontal projected area of the bulge 6' towards the middle frame 4' is less than a frontal projected area of the piezoelectric actuator 7' towards the middle frame 4'.

The bulge 6' and the middle frame 4' are integrally formed, and the supporting arm 5' is a simple strip, and this solution make the manufacture and molding of the supporting arm 5' more convenient and quicker.

The structure and connection of the piezoelectric actuator 7' are the same as the embodiment 1.

The structure and connection of the weight 8' are the same as the embodiment 1.

This utility model provides a kind of new electronic device, a cantilever beam structure formed by the supporting arm 5 and the bulge 6 at the point where the middle frame 4 and the piezoelectric actuator 7 are connected, or a cantilever beam structure formed by the middle frame 4' and the bulge 6' makes the piezoelectric actuator 7 and the middle frame 4 set in interval, and increases the driving force output by the electronic device 100, and improves the quality of the electronic device 100 effectively; of which, the cantilever beam structure can be not only molded by the bulge 6 and supporting arm 5 in integrated manner, but also molded by the bulge 6' and the middle frame 4' in integrated manner, in order to make the manufacture of the supporting arm 5' easier, and reduce the manufacture cost; the frontal projected area of the bulge 6 on the middle frame 4 is less than the piezoelectric actuator 7, which saves the internal space of the electronic device 100 effectively.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An electronic device, comprises:
   a display screen;
   a middle frame assembled with the display screen;
   a supporting arm opposed to the middle frame;
   a piezoelectric actuator fixed on the supporting arm;
   a bulge disposed between the middle frame and the supporting arm, the bulge being fixed to the middle frame, and connected to one end of the supporting arm.

2. The electronic device as described in claim 1, wherein a frontal projected area of the bulge on the middle frame is less than a frontal projected area of the piezoelectric actuator on the middle frame.

3. The electronic device as described in claim 2, wherein a cantilever beam structure is formed between the supporting arm and the bulge.

4. The electronic device as described in claim 3, wherein the supporting arm is a long strip.

5. The electronic device as described in claim 1, wherein the supporting arm includes a lower surface facing the middle frame and an upper surface opposite to the lower surface, the piezoelectric actuator is fixed on the upper surface.

6. The electronic device as described in claim 1, wherein the bulge and the supporting arm are integrally formed.

7. The electronic device as described in claim 1, wherein the bulge and the middle frame are integrally formed.

8. The electronic device as described in claim 5 further including a weight, wherein the weight is located at another end of the supporting arm away from the bulge.

9. The electronic device as described in claim 8, wherein the weight is fixed to the upper surface of the supporting arm.

10. The electronic device as described in claim 9, wherein the weight keeps a distance from the piezoelectric actuator.

\* \* \* \* \*